(12) United States Patent
    Harrison

(10) Patent No.: US 9,866,139 B2
(45) Date of Patent: Jan. 9, 2018

(54) INDUCTIVE POWER TRANSFER CONVERTER

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 904 days.

(21) Appl. No.: 14/143,119

(22) Filed: Dec. 30, 2013

(65) Prior Publication Data

US 2014/0183968 A1    Jul. 3, 2014

Related U.S. Application Data

(60) Provisional application No. 61/747,359, filed on Dec. 30, 2012.

(51) Int. Cl.
    *H02M 5/458* (2006.01)
    *H02M 5/297* (2006.01)
    *H02J 5/00* (2016.01)
    *H02M 1/00* (2006.01)

(52) U.S. Cl.
    CPC ......... *H02M 5/4585* (2013.01); *H02M 5/297* (2013.01); *H02J 5/005* (2013.01); *H02M 2001/0012* (2013.01); *H02M 2001/0058* (2013.01); *Y02B 70/145* (2013.01); *Y02B 70/1491* (2013.01)

(58) Field of Classification Search
    CPC .................................................. H02M 5/4585
    See application file for complete search history.

(56) References Cited

U.S. PATENT DOCUMENTS

2012/0126755 A1*  5/2012  Perisic ............... B60L 11/1811
                                                      320/145
2014/0160800 A1*  6/2014  Zimmanck .......... H02M 3/3376
                                                        363/17

OTHER PUBLICATIONS

Govic et al., "Inductive Power Transfer (IPT) Powering our Future", The University of Auckland, Power Electronics Research Group, 2010.
Huang et al., "Resonant Network Design Considerations for Variable Coupling Lumped Coil Systems", IEEE, Energy Conversion Congress and Exposition (ECCE) Sep. 2012, pp. 3841-3847, 2012.

* cited by examiner

*Primary Examiner* — Jared Fureman
*Assistant Examiner* — James Evans
(74) *Attorney, Agent, or Firm* — Moser Taboada

(57) ABSTRACT

A bidirectional inductive power transfer (IPT) power converter comprising a cycloconverter, coupled to an AC port, and a resonant circuit, coupled to the cycloconverter, for storing energy and coupling energy to an IPT port.

20 Claims, 2 Drawing Sheets

INDUCTIVE POWER TRANSFER CONVERTER

CROSS-REFERENCE TO RELATED APPLICATIONS

This application claims priority to U.S. Provisional Patent Application No. 61/747,359 filed on Dec. 30, 2012, which is incorporated by reference herein in its entirety.

BACKGROUND

Field

Embodiments of the present invention generally relate to power conversion techniques and, more particularly, to efficient power conversion for inductive power transfer (IPT).

Description of the Related Art

Inductive Power Transfer (IPT) is the contactless transfer of power between two inductor coils. An IPT converter comprises an AC-DC power converter and an IPT coil that inductively couples DC power to a load coil. Applications for IPT include "wireless" charging of batteries in electric vehicles and portable devices (e.g., mobile phones, laptops, computer tablets, and the like), as well as wireless power transfer in mass transit systems (e.g., between mass transit vehicles for trains, subways, trolleys, and the like as well as coupling the vehicles to the transit power system).

Since IPT generally has a low efficiency during power transfer between the IPT coil and the load coil, it is desirable to ensure power is efficiently converted and provided to the IPT coil. Power conversion and transfer characteristics change depending on the unloading/loading of the IPT coil as well as during operation should the target load coil move while connected to the IPT system. Such variations in the load, detrimentally impacts the power conversion efficiency of the power converter.

Therefore, there is an IPT converter for efficiently converting and coupling power.

SUMMARY

Embodiments of the present invention generally relate to a method and apparatus for an IPT power transfer converter as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to an inductive power transfer (IPT) converter capable of bi-directional power transfer. The IPT converter comprises a bidirectional power converter coupled to an IPT coil. When a load coil is positioned proximate the IPT coil, power is coupled to a load (e.g., a battery of an electronic device) via inductive coupling between the IPT coil and the load coil. In addition, power may be coupled from the load (operating as a source of power) and converted to AC power by the same circuitry. In either direction, the IPT converter dynamically adjusts the power conversion to adapt to load variations and source variations to achieve the most efficient bi-directional power transfer.

Figure 1:
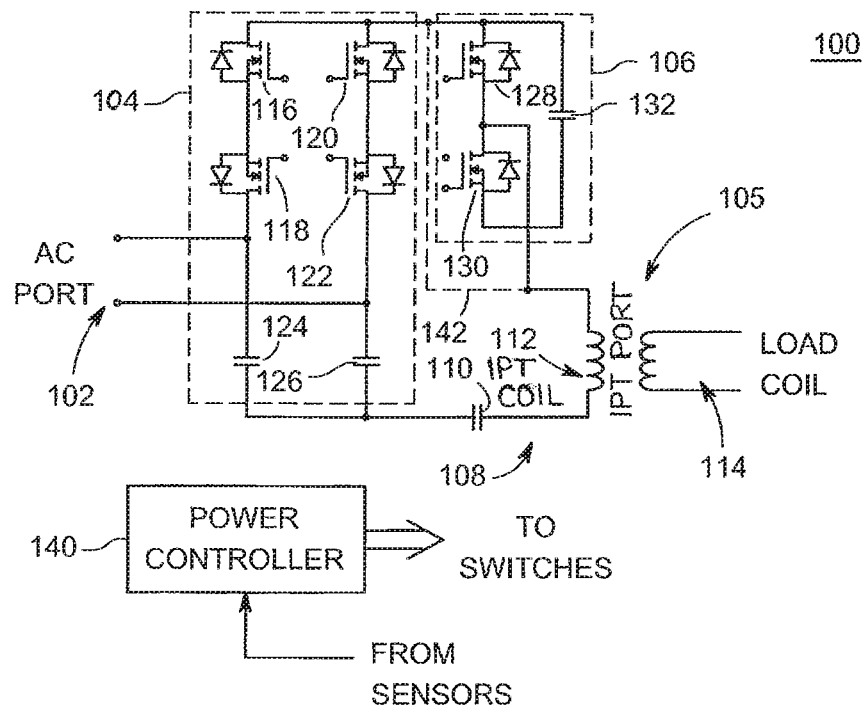
FIG. 1 depicts a schematic for an exemplary single phase IPT converter in accordance with one or more embodiments of the present invention.

FIG. 1 depicts a schematic for an exemplary single phase IPT power transfer converter 100 in accordance with one or more embodiments of the present invention. The schematic as described is an exemplary IPT converter (hereinafter, "converter") 100 converting AC power (from the AC grid, 50 or 60 Hz) to high frequency (e.g., about 100 kHz) AC power in a first mode or a "supply mode", i.e., supplying power to a load. The frequency is a result of the switching performed by the converter 100 and is optimized by a switch controller to optimize the power conversion and inductive coupling between the converter 100 and a load. Further embodiments also converting high frequency AC power to AC power (50 or 60 Hz) in a second mode of operation or a "receive mode", i.e., receiving power from the load. Thus, the converter 100 may operate as a bi-directional converter, e.g., supplying power to an electronic device or extracting power from an electronic device.

The converter 100 comprises an AC port 102, cycloconverter 104, a buffer block 106, an IPT port 105 and a resonant circuit 108 comprising a resonant capacitor 110 and an IPT coil 112. Operation of the converter 100 is controlled by a power controller (hereinafter, "controller") 140 disclosed in detail below with respect to FIG. 3.

The cycloconverter 104, the buffer block 106 and the resonant circuit 108 operate in concert to bi-directionally convert power while utilizing the resonant circuit 108 to temporarily buffer (store) energy during the conversion process. The cycloconverter 104 and buffer block 106 can supply energy into the resonant circuit 108 or extract energy from the resonant circuit 108. The controller 140 controls the timing of the cycloconverter and buffer block switches to control flow of energy into and out of the resonant circuit 108. When operating in supply mode, the switch timing is adjusted to adapt to changes in both the characteristics of the AC source power at the AC port 102 and the load characteristics at the IPT port 105. Similarly, when operating in receive mode, the switch timing is adjusted to adapt to changes in both the characteristics of the IPT source power (from the load) and the AC load characteristics (typically, the AC grid).

The cycloconverter 104 comprises switches 116, 118, 120 and 122 and capacitors 124 and 126. Source terminals of each switch pair 116/118, and 120/122 are coupled together (i.e., the source terminals of switches 116/118 are coupled together, and the source terminals of switches 120/122 are coupled together). Drain terminals of the switches 118 and 122 are coupled to first and second output terminals of the AC port 102. In some embodiments, the AC lines may be to a commercial power grid.

In addition, drain terminals of the switches 118 and 122 are each respectively coupled to a first terminal of capacitors 124 and 126. The second terminals of the capacitors 124 and 126 are connected in parallel with a first terminal of resonant capacitor 110. A second terminal of the resonant capacitor 110 is coupled to a first terminal of the IPT coil 112. The resonant capacitor 110 operating with the inductance from the IPT coil 112 to operate as a series resonant tank circuit.

The buffer block 106 is a half-wave bridge circuit, comprising switches 128 and 130 and a storage capacitor 132. The buffer block 106 enables the IPT coil 112 to be driven with constant power over the entire AC mains period. In applications that do not require the power transfer to be continuous and can accommodate a twice line frequency (100 Hz or 120 Hz) energy transfer envelope, then the buffer block 106 can be omitted (as indicated by path 142).

Specifically, the buffer block 106 comprises switches 128 and 130 as well as a capacitor 132. A source terminal of switch 128 is coupled to a drain terminal of switch 130 as well as a second terminal of the IPT coil 112. A drain terminal of switch 128 is coupled to a first terminal of the storage capacitor 132. A source terminal of switch 130 is coupled to a second terminal of the storage capacitor 132. The storage capacitor 132 is decoupled from IPT coil 112 and selectively charged or discharged by the buffer block switches 128 and 130. By decoupling the storage capacitor 132, charging or discharging of the storage capacitor is independent from the voltage on the IPT coil 112.

As described below, the controller 140 uses various signal samples to derive switch control signals. The signal samples may include voltage and/or current samples from voltage and/or current sensors (not shown) located at both the AC port and the IPT port.

In the supply mode the IPT converter 100 converts AC power at the AC port 102 into high frequency AC power to be applied to the IPT coil 112. The high frequency facilitates efficient inductive energy coupling from the IPT coil 112 and the load coil 114. The cycloconverter 104 receives single phase AC power at the AC port 102. As will be described further below with respect to FIG. 3, the cycloconverter 104 outputs a high frequency alternating current waveform to the buffer block 106. In order to provide dynamic adjustment of power conversion to match variations in load characteristics at the IPT coil 112, the cycloconverter 104 stores energy on capacitors 124 and 126, and applies the energy to the IPT coil 112 to optimize power transfer. The buffer block 106 receives a high frequency (about 100 kHz) AC waveform having a twice line frequency envelope from the cycloconverter 104. The buffer block 106 is switched to supply a substantially constant energy output to the IPT coil 112. The timing of the switches is determined by the controller 140. Since the point of resonance of the resonance circuit 108 varies with the load characteristic, the switching of the cycloconverter 104 is dynamically altered to maximize power transfer to the load. As the load impedance varies, the switch timing automatically adjusts to match the new resonance. Thus, the converter 100 provides dynamic adjustment of power conversion to match variations in load characteristics. In some embodiments, the converter 100 operates (i.e., switches) at a higher nominal frequency than the peak resonant frequency of resonant circuit such that, from the perspective of the cycloconverter 104, the resonant circuit is seen as an inductive load at all times. Alternatively, should a parallel resonant tank circuit (i.e., resonant capacitor 110 coupled in parallel with the IPT coil 112) be used, the converter 100 operates at a lower frequency than resonance such that the bridge circuit experiences an inductive load at all times.

In the receive mode, the IPT coil 112 receives power from the load coil 114, converts the high frequency AC power to AC grid power, and outputs the AC power to the AC port 102. The received power at the IPT coil 112 is coupled to the buffer block 106. The buffer block 106 outputs a high frequency square wave (e.g., about 100 kHz) that is passed through the resonant capacitor 110 to output a substantially sinusoidal waveform to the cycloconverter 104. The cycloconverter 104 uses capacitors 124 and 126 to selectively output AC power at the AC port 102. The cycloconverter 104 in some embodiments may be adapted to store more energy on capacitors 124 and 126 when desirable to output higher voltage waveforms. Thus, the converter 100 provides dynamic power conversion to match the AC load (e.g., a commercial power grid).

In other embodiments, switch pairs (e.g., 116/118 and 120/122) may each represent a single bidirectional metal-oxide-semiconductor field effect transistor (MOSFET).

Figure 2:
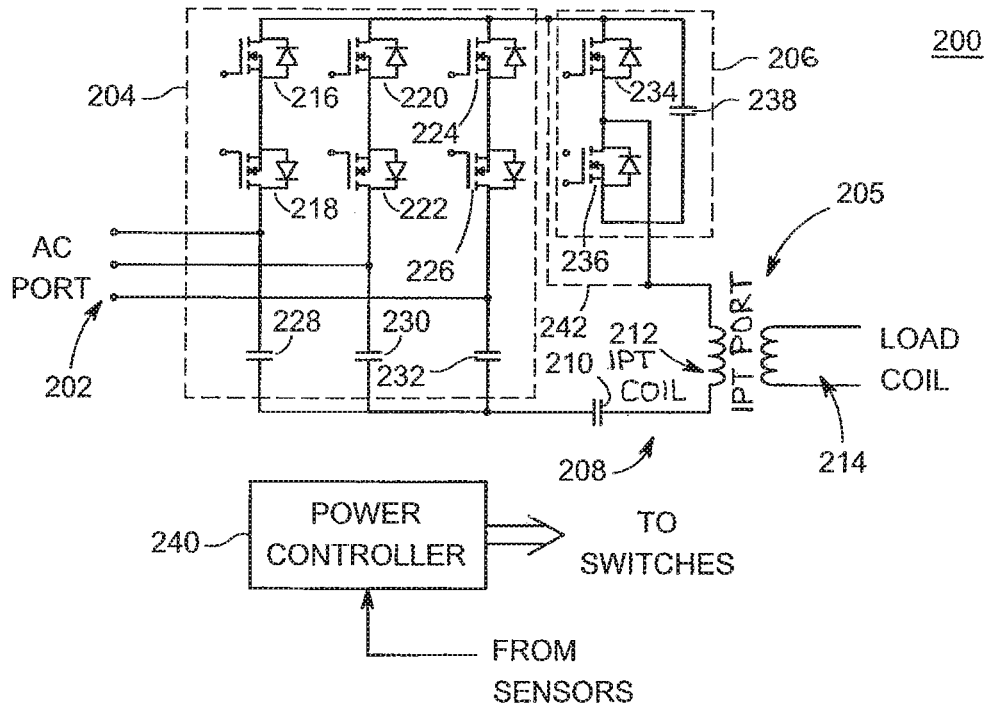
FIG. 2 depicts a schematic for an exemplary three phase IPT converter in accordance with one or more embodiments of the present invention.

FIG. 2 depicts a schematic for an exemplary three phase IPT power transfer converter 200 in accordance with one or more embodiments of the present invention. The schematic as described is an exemplary IPT converter (hereinafter, "converter") 200 converting AC power (from the AC grid, 50 or 60 Hz) to high frequency (e.g., about 100 kHz) AC power in a first mode or a "supply mode", i.e., supplying power to a load. The frequency is a result of the switching performed by the converter 200 and is optimized by a switch controller to optimize the power conversion and inductive coupling between the converter 200 and a load. Further embodiments also include operation as converting high frequency AC power to AC power (50 or 60 Hz) in a second mode of operation or a "receive mode", i.e., receiving power from the load. Thus, the converter 200 may operate as a bi-directional converter.

The converter 200 comprises an AC port 202, cycloconverter 204, a buffer block 206, an IPT port 205 and a resonant circuit 208 comprising a resonant capacitor 210 and an IPT coil 212. Operation of the converter 200 is controlled by a power controller (hereinafter, "controller") 240 disclosed in detail below with respect to FIG. 3.

The cycloconverter 204, the buffer block 206 and the resonant circuit 208 operate in concert to bi-directionally convert power while utilizing the resonant circuit 208 to temporarily buffer (store) energy during the conversion process. The cycloconverter 204 and buffer block 206 can supply energy into the resonant circuit 208 or extract energy from the resonant circuit 208. The controller 240 controls the timing of the cycloconverter and buffer block switches to control flow of energy into and out of the resonant circuit. When operating in supply mode, the switch timing is adjusted to adapt to changes in both the characteristics of the AC source power at the AC port 202 and the load characteristics at the IPT port 205. Similarly, when operating in receive mode, the switch timing is adjusted to adapt to changes in both the characteristics of the IPT source power (from the load) and the AC load characteristics (typically, the AC grid).

The cycloconverter 204 comprises switches 216, 218, 220, 222, 224, and 226 and capacitors 228, 230 and 232. Source terminals of each switch pair 216/218, 220/222, and 224/226 are coupled together (i.e., the source terminals of switches 216/218 are coupled together, the source terminals of switches 220/222 are coupled together, and the source terminals of switches 224/226 are coupled together). Drain terminals of the switches 218, 222, and 226 are coupled to first, second, and third output terminals of the AC port 202. In some embodiments, the AC lines may be to a commercial power grid.

In addition, drain terminals of the switches 218, 222, and 224 are each respectively coupled to a first terminal of capacitors 228, 230, and 232. The second terminals of the capacitors 228, 230, and 232 are connected in parallel with a first terminal of resonant capacitor 210. A second terminal of the resonant capacitor 210 is coupled to a first terminal of the IPT coil 212. The resonant capacitor 210 operating with the inductance from the IPT coil 212 to operate as a series resonant tank circuit.

The buffer block 206 is a half-wave bridge circuit, comprising switches 234 and 236 and a storage capacitor 238. The buffer block 206 is not necessary if converter 200 is to be operated from three-phase power, however including the buffer block enables the IPT coil 212 to be driven with constant power over the entire AC mains period if the converter 200 is connected to a single phase AC supply. In applications that do not require the converter to be able to operate from a single phase AC supply or for the power transfer to be continuous when operating from a single phase AC supply and can accommodate a twice line frequency (100 Hz or 120 Hz) energy transfer envelope, then the buffer block 206 can be omitted (as indicated by path 242).

A source terminal of switch 234 is coupled to a drain terminal of switch 236 as well as a second terminal of the IPT coil 212. A drain terminal of switch 234 is coupled to a first terminal of the storage capacitor 238. A source terminal of switch 236 is coupled to a second terminal of the storage capacitor 238. The storage capacitor 238 is decoupled from IPT coil 212 and selectively charged or discharged by the buffer block switches 234 and 236. By decoupling the storage capacitor 238, charging or discharging of the storage capacitor is independent from the voltage on the IPT coil 212.

As described below, the controller 240 uses various signal samples to derive switch control signals. The signal samples may include voltage and/or current samples from voltage and/or current sensors (not shown) located at both the AC port and the IPT port.

In the supply mode, the IPT converter 200 converts AC power at the AC port 202 into high frequency AC power to be applied to the IPT coil 212. The cycloconverter 204 receives three phase AC power at the AC port 202. As will be described further below with respect to FIG. 3, the cycloconverter 204 outputs a single phase, high frequency current waveform to the buffer block 206 by combining the three phases (e.g., from L1, L2, and L3) into a single phase AC power. In order to provide dynamic adjustment of power conversion to match variations in load characteristics at the IPT coil 212, the cycloconverter 204 may store more energy on capacitors 228, 230, 232, and applies the energy to the IPT coil to optimize power transfer. The buffer block 206 receives a high frequency (about 100 kHz) AC waveform from the cycloconverter 204. The buffer block 206 is switched to supply a substantially constant energy output to the IPT coil 212. The timing of the switches is determined by the controller 240. Since the point of resonance of the resonance circuit 212 varies with the load characteristic, the switching of the cycloconverter 204 is changed to maximize power transfer to the load. As the load impedance varies, the switch timing automatically adjusts to match the new resonance. Thus, the converter 200 provides dynamic adjustment of power conversion to match variations in load characteristics. In some embodiments, the converter 200 operates (i.e., switches) at a higher nominal frequency than the peak resonant frequency of resonant circuit such that, from the perspective of the cycloconverter 204, the resonant circuit is seen as an inductive load at all times. Alternatively, should a parallel resonant tank circuit (i.e., resonant capacitor 210 coupled in parallel with the IPT coil 212) be used, the converter 200 operates at a lower frequency than resonance such that the bridge circuit experiences an inductive load at all times.

In the receive mode, the IPT coil 212 receives power from the load coil 214, converts the high frequency AC power to AC grid power, and outputs the AC power to the AC port 202. The received power at the IPT coil 212 is coupled to the buffer block 206. The buffer block 206 outputs a high frequency square wave (e.g., about 100 kHz) that is passed through the resonant capacitor 210 to output a substantially sinusoidal waveform to the cycloconverter 204. The cycloconverter 204 uses capacitors 228, 230, and 232 to selectively output waveforms on each line (L1, L2, and L3) forming the three-phase AC output at the AC port 202. The cycloconverter 204 in some embodiments may be adapted to store more energy on capacitors 228, 230, and 232 when desirable to output higher voltage waveforms. Thus, the converter 200 provides dynamic power conversion to match the AC load (e.g., a commercial power grid).

In other embodiments, switch pairs (e.g., 212/216, 220/222, and 224/226) may each represent a single bidirectional metal-oxide-semiconductor field effect transistor (MOSFET).

Figure 3:
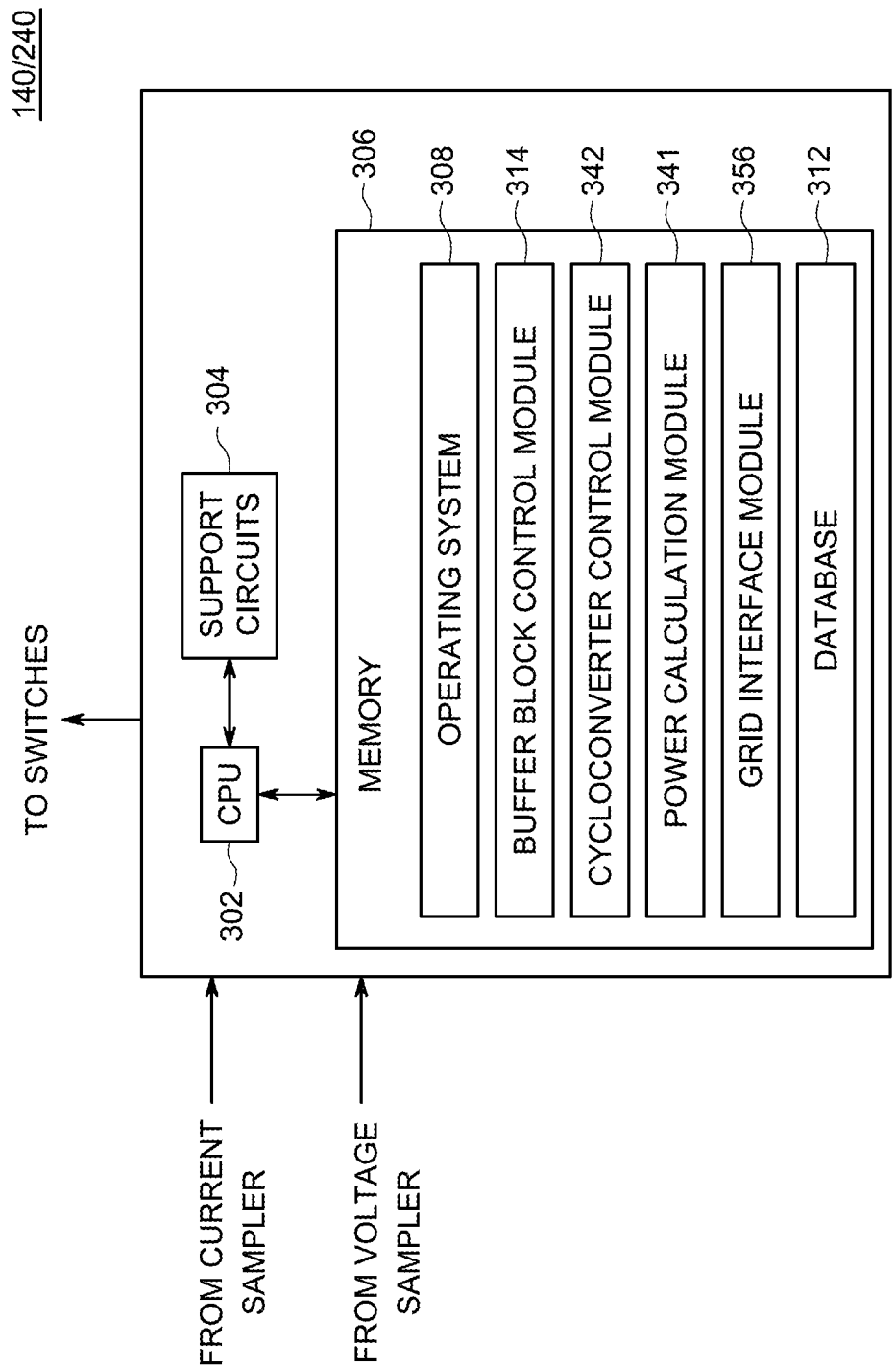
FIG. 3 depicts a block diagram of an exemplary controller to control the switches of the IPT power transfer converter of FIGS. 1 and 2 in accordance with one or more embodiments of the present invention.

FIG. 3 depicts a block diagram of an exemplary controller 140/240 to control the switches in accordance with one or more embodiments of the present invention. The controller 140/240 is coupled to switches (e.g., at the gates and/or sources) for bi-directional power conversion of power for the IPT coil.

The power controller (hereinafter "controller") 140/240 comprises support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The CPU 302 is connected to the gates and/or sources of the transistors of the aforementioned embodiments to control switching within the converter 100/200. The support circuits 304 are circuits used to promote functionality of the CPU 302. Such circuits include, but are not limited to, a cache, power supplies, clock circuits, buses, input/output (I/O) circuits, and the like. The controller 140/240 may be implemented using a general purpose computer that, when executing particular software, becomes a specific purpose computer for performing various embodiments of the present invention.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the controller 140/240 that can be supported by the CPU capabilities. In alternative embodiments, the controller 140/240 is a microcontroller without an operating system.

The controller 140/240 receives sample signals from current and/or voltage sensors (not shown).

The memory 306 may store various forms of application software, such as a buffer block control module 314, a cycloconverter control module 342, a power calculation module 341, a grid interface module 356, and a database 312. Similarly, memory 306 may store algorithms for soft switching the cycloconverter to supply a specific AC frequency. Soft switching techniques including zero voltage switching (ZVS), zero current switching (ZCS), voltage clamping, zero transition and the like. In alternative embodiments, the bridge control module 314, the cycloconverter control module 342, the power calculation module 341, and the grid interface module 356 may be located in separate respective controllers.

The buffer block control module 314 controls operation of the switches in the buffer block to perform functions related to embodiments of the present invention. Based on the current and voltage samples, the power calculation module 340 computes the generated power level and couples such computed power level data to the buffer block control module 314. The buffer block control module 314 then compares the computed power level to a required output power level and adjusts the switching frequency of the buffer block to increase or decrease the generated power as needed. In a supply mode, the buffer block control module 314 may operate the buffer block to selectively charge and discharge the storage capacitor (e.g., a bulk storage capacitor) to output constant power to the IPT coil. In a receive mode, the buffer block control module 314 operates the buffer block to convert high frequency AC power from the IPT coil into a high frequency square wave (e.g., 100 kHz). In either mode of operation, varying load characteristics on the resonant circuit comprising the IPT coil and resonant capacitor is dynamically compensated by control of the switching states. In some embodiments, the switching frequency adjusts to optimize the power conversion of the converter 100/200.

For example, the controller 240 executes the buffer block control module 314 to convert and supply the required power to the IPT coil based on power calculations computed by the power calculation module 341. In some embodiments, the required output power varies as the load power requirements and impedance varies from use to use. For example, a laptop battery of greater energy density and size requires a higher charging current than that of a smartphone as per a power calculation algorithm from a power calculation module 341. Alternatively, the load may not be perfectly coupled to the IPT coil (e.g., distance, wrong orientation, obstructions, and the like) that may affect the resonance of the load. In other embodiments, the required output power may be manually entered or be a predetermined value stored in database 312. Further still, various embodiments may be arranged to have the required output power be the maximum possible power output for the converter 100/200.

In some embodiments, the grid interface module 356 generates a reference waveform synchronous with the grid voltage waveform and couples the reference waveform to the cycloconverter control module 342 to operate the cycloconverter. The reference waveform ensures that even if the grid voltage deviates from a sinewave, each phase of output current generated can be controlled to match the desired output in the supply mode. In the receive mode, the cycloconverter is operated to match variations in the input power and optimally convert power to match the characteristics of the AC grid. However, in the event of the grid voltage and/or frequency deviate from required operational specifications, the controller 140/240 deactivates the converter 100/200.

When operating in a supply mode, the cycloconverter control module 342 operates the switches of the cycloconverter based on the grid interface module 356 to selectively control switches to output a high frequency AC power into the resonant circuit.

The converter 100/200 dynamically compensates for load variations presented to the IPT coil. As such, in the supply mode, the buffer block, cycloconverter and resonant circuit operate in concert to optimize power conversion based upon the desired output power to be delivered to the load.

Bi-directional energy transfer allows the IPT target loads such as batteries to be drawn upon in times of heavy AC grid loading to perform a "peak shaving" function. Bi-directional power transfer via IPT systems also enable vehicle batteries to be charged at a time when power is inexpensive and transferred back to the AC grid at a time when power is expensive. Thus, in some instances enabling energy storage within an electric vehicle to allow trading of energy on a "spot price" market. Additionally, a bidirectional IPT converter may be used to transfer energy from one energy storage system to another energy storage system. For example, an electric automobile battery (or another energy storage system) may be charged from the AC grid during a low energy cost period and that low-cost energy can be transferred to a second automobile battery at a time when the second battery would be otherwise charged with high-cost energy for the AC grid.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. An inductive power transfer (IPT) power converter comprising:
   a cycloconverter, coupled to an AC port;
   a resonant circuit, comprising an IPT coil and coupled to the cycloconverter, for coupling energy from the cycloconverter to an IPT port; and
   a controller for dynamically adjusting switch timing of the cycloconverter in accordance with at least one change in a point of resonance of the resonant circuit, the at least one change resulting from a change in a characteristic of a load electrically coupled to the IPT port.

2. The converter of claim 1 further comprising a buffer block coupled to both the cycloconverter and the resonant circuit.

3. The converter of claim 2, wherein the buffer block comprises at least two switches coupled across a bulk energy storage device.

4. The converter of claim 2, wherein the controller independently operates the cycloconverter and the buffer block based on detected power at the AC port and the IPT coil.

5. The converter of claim 3, wherein the bulk energy storage device is decoupled from the IPT coil.

6. The converter of claim 1, wherein the cycloconverter comprises at least two pairs of switches coupled in parallel.

7. The converter of claim 6, wherein the AC port is coupled between the at least two pairs of switches and at least two energy storage devices.

8. The converter of claim 1, wherein a resonant capacitor is coupled to a terminal of the IPT coil, where the IPT coil forms the IPT port.

9. The converter of claim 1, wherein the cycloconverter selectively converts (1) energy at the AC port for output at the IPT port, and (2) energy at the IPT port for output at the AC port.

10. The converter of claim 1 wherein the controller dynamically adjusts the timing of energy conversion performed by the cycloconverter to optimize an amount of energy coupled from the AC port to the IPT port or from the IPT port to the AC port.

11. The converter of claim 10 further comprising a buffer block, wherein the controller controls the timing of the buffer block to ensure a substantially constant energy level is coupled to the AC port or the IPT port.

12. The converter of claim 1 wherein the cycloconverter converts AC power from an AC grid to a higher frequency AC power to be coupled to the IPT port.

13. The converter of claim 12 wherein the higher frequency AC power has a frequency similar to the resonant frequency of the resonant circuit.

14. The converter of claim 13 wherein the frequency is about 100 kHz.

15. A method of power conversion by an inductive power transfer (IPT) power converter comprising:
 operating a cycloconverter of the IPT power converter, the cycloconverter coupled to an AC port and to a resonant circuit comprising an IPT coil for coupling energy from the cycloconverter to an IPT port, by dynamically adjusting switch timing of the cycloconverter in accordance with at least one change in a point of resonance of the resonant circuit, the at least one change resulting from a change in a characteristic of a load electrically coupled to the IPT port; and
 coupling energy from the cycloconverter to the IPT coil via the resonant circuit.

16. The method of claim 15, further comprising operating a buffer block to provide a constant power to or from the IPT coil.

17. The method of claim 15 wherein the operating step comprises selectively bi-directionally converting energy (1) at the AC port for output at the IPT coil or (2) at the IPT coil for output at the AC port.

18. The method of claim 15 wherein the operating step further comprises selectively converting (1) AC grid power to a higher frequency AC power or (2) an AC power to AC grid power.

19. The method of claim 18 wherein the higher frequency grid power has a frequency similar to a resonant frequency of the resonant circuit.

20. The method of claim 19 wherein the frequency is about 100 kHz.

* * * * *